United States Patent [19]

Clendenin

[11] 3,853,686

[45] Dec. 10, 1974

[54] POLYVINYL ACETATE RESIN IMPREGNATED PLASTIC LAMINATE AND PROCESS THEREFOR

[75] Inventor: William H. Clendenin, Cochocton, Ohio

[73] Assignee: General Electric Company, Schenectady, N.Y.

[22] Filed: Dec. 19, 1972

[21] Appl. No.: 316,577

[52] U.S. Cl. ............... 161/167, 161/250, 161/270, 161/251, 161/264, 117/155 UA
[51] Int. Cl. ............................................... C09j 7/02
[58] Field of Search...... 117/155 UA; 161/251, 165, 161/162, 248, 247, 250, 258, 264, 167

[56] References Cited
UNITED STATES PATENTS

| | | |
|---|---|---|
| 3,297,610 | 1/1967 | Moyer......................... 117/155 UA |
| 3,549,403 | 12/1970 | Williams et al. ............. 117/155 UA |
| 3,620,899 | 11/1971 | Kelly et al...................... 161/258 X |
| 3,632,535 | 1/1972 | Gramera et al. .............. 117/155 UA |
| 3,703,492 | 11/1972 | Masuda et al. ................ 161/251 X |
| 3,769,151 | 10/1973 | Knutson et al.................. 161/251 X |

*Primary Examiner*—George F. Lesmes
*Assistant Examiner*—Patricia C. Ives

[57] ABSTRACT

Thermosetting resin impregnated paper laminates are provided which have good integrity and are readily adherable to substrates using a wide range of adhesives. These qualities are imparted by applying to the outer side of the back core surface particular polyvinyl acetate compositions, such compositions being coated on the core paper immediately after it is impregnated with its thermosetting resin while still wet with said resin and before drying and assembling into the final laminate.

3 Claims, No Drawings

POLYVINYL ACETATE RESIN IMPREGNATED PLASTIC LAMINATE AND PROCESS THEREFOR

This invention relates to plastic laminates which are prepared by laying up and consolidating under heat and pressure a plurality of layers of thermosetting resin impregnated paper. More particularly, it relates to such laminates which are possessed of good integrity or resistance to delamination as well as non-blocking characteristics during preparation along with the ability to be adhered to substrates or backing materials with a wide range of adhesives.

Plastic laminates prepared from superimposed layers of paper impregnated with thermosetting resins and consolidated under heat and pressure are well known. Generally speaking, such laminates consist of one or more so-called resin impregnated core layers which may have superimposed thereon a print paper for decorative purposes. In many cases the decorative or print layer is overlaid with a protective layer which is relatively transparent so that the print or design can be viewed. Typically, the core layers are of ordinary or creped kraft paper which can be impregnated with any of a number of thermosetting resins. Preferred and most generally used is a condensation product of a phenol and an aldehyde and more particularly an alkali catalyzed phenol formaldehyde condensation product typified by Resinox 470. Generally speaking, the resin content of the core paper ranges from about 25 to 29 percent by weight for ordinary kraft paper and from about 34 to 37 percent by weight of resin for a normally used creped kraft paper. The print paper is usually impregnated with a thermosetting resin which is characterized by resistance to discoloring, resistance to wear and which also has translucent or transparent qualities. While any of a number of resins can be used for this purpose, modified melamine formaldehyde reaction products are particularly useful in this respect. An example of such a melamine formaldehyde resin is Cymel 428. This resin is a white, free-flowing powder specifically designed for the purpose and is readily soluble in water or in alcohol-water solvents, giving a clear, colorless solution, stable at 50 percent solids content for at least two days at room temperature. When an overlay sheet or protective layer is used over the print sheet, it is generally of a high purity, highly translucent alpha cellulose paper, rayon paper and the like which is treated with the same resin as the print paper to a resin content of about 60 to 65 percent by weight. The resin impregnated core sheets are dried without substantially advancing the cure of the resin and laid up in the desired number, such core layup being overlaid with a dried resin impregnated print paper and overlay paper where desired. The whole is then cured in the usual manner as by placing between polished stainless steel panels at times varying from about 20 to 25 minutes at from about 130°C to 150°C at pressures ranging from 1000 psi to 1500 psi, the laminates then being cooled, still under pressure, to below about 40°C and removed from the press. Abrasion resistant materials can be included in the overlay paper or in a coating on the print paper or decorative surface.

While laminates prepared in the above manner are useful for many purposes in and of themselves, they are normally in actual use applied to or adhered to a substrate or backer material such as plywood, particle board, chipboard, hardboard, metal and the like in which state they are used as desk tops, countertops, wall paneling, flooring and the like. While such laminates are readily adherable to the substrate or backer by means of so-called contact adhesives, such adhesives are relatively expensive. When using cheaper adhesives such as urea formaldehyde adhesives, white glues such as polyvinyl acetate materials, phenolic or resorcinol formaldehyde adhesives and adhesives prepared from epoxy and other resins, asphalts, coal tars and animal glues, it is necessary to especially prepare the back of the laminate by a sanding operation. This sanding which is necessary for the proper adhesion of the laminate to the less expensive adhesives is not only relatively expensive but in the case of the thinner laminates where relatively few core sheets are used, tends to unduly reduce the thickness of and weaken or even break the plastic laminate.

Attempts have been made with some degree of success to eliminate the sanding of the laminate back while still making it receptive to adhesion with a wide variety of adhesives. According to U.S. Pat. No. 3,620,899, the outer surface of the backmost or rear core sheet of the laminate is coated with a polyvinyl acetate-starch composition after the impregnation of the particular core layer after the resin has been dried and before the core sheet is laid up in preparing the laminate. The inclusion of starch is necessary to prevent blocking of the treated core sheet when it is stored in rolls or in stacks. While such treatment has its advantages, it does, as stated above, require the use of starch to prevent blocking and also requires an extra step, that of drying the material after resin impregnation and again after coating.

It is quite evident that there is a need for plastic laminates which are receptive to a wide range of adhesive materials but which are not unduly complicated in their preparation as by extra drying steps and the inclusion of special blocking deterrents, and it is a primary object of the present invention to provide such laminates and methods for preparing them.

Those features of the invention which are believed to be novel are set forth with particularity in the claims appended thereto. The invention will, however, be better understood and further objects and advantages appreciated from a consideration of the following description.

Briefly, according to the present invention, the back or rearmost laminate core sheet which is to be coated with or is next to the adhesive is treated during preparation while still wet with its thermosetting resin impregnant, and before drying, with a special polyvinyl acetate composition as more fully described hereinafter, the core sheet then being dried in the usual manner without advancing the cure of the resins and laid up in a laminate as desired with the specially treated surface at the side of the laminate away from the decorative surface.

It has been found that core sheets can be treated with a composition containing by weight from about 65 to 80 percent of a polyvinyl acetate ethylene copolymer emulsion typified by Airflex 400, along with from about 35 to 20 percent by weight of a viscous, milk-white, high solids dispersion in water of vinyl acetate homopolymers typified by Elvacet 81-900. Airflex 400, as pointed out above, is a copolymer of ethylene and polyvinyl acetate and has a solids content of from about 55 to 57 percent by weight. It has a viscosity of 1100 to 1600 cps using a Brookfield viscometer, Model LVF, at 60 rpm and 77°F. The pH of the specific material ranges from about 5 to 6.5 and contains a small amount of protective colloid consisting of partially acetylated polyvinyl alcohol but no carbohydrate. The average particle size is from about 0.2 to 1 micron and its density is 8.9 lbs. per gallon. The particular Elvacet 81–900 used provides a reading of 8.5 to 10 poises when tested in a Brookfield viscometer, Model LVF, using a No. 2 spindle at 6 rpm or a No. 3 spindle at 30 rpm and 77°F. The average particle size of this material ranges from about 1 to 3 microns and it has a density of 9.2 lbs. per gallon. While the proportions of the two materials can be varied as above, the most preferred composition is one consisting of by weight 75 percent Airflex 400 and 25 percent Elvacet 81–900. In practicing the present invention, the coating materials are mixed together in the desired proportions and applied by any normal coating procedure to the back side of the rearmost core layer after the core sheet has been impregnated with its thermosetting resin and while still wet with such resin, thus eliminating the extra step of drying the impregnated material before the special coating as in the prior art and without using any particular anti-blocking agent.

The following examples will illustrate the practice of the present invention, it being realized that they are to be taken as exemplary and not limiting in any way.

EXAMPLE 1

This example illustrates the practice of the present invention. A mixture of by weight 75 percent Airflex 400 and 25 percent Elvacet 81–900 was coated on one side of a phenolic resin impregnated core sheet while said sheet was still wet with the impregnant and before drying in the oven. When such a sheet was used as the back sheet of a laminate prepared as described above, the resulting laminate with the coating exposed adhered well to a particle board substrate used in all examples utilizing contact adhesive, urea based glues, white glues, and resorcinol glue without sanding. When the sheet so treated was stored before being assembled into a laminate in a roll or stack, there was no blocking. The 0.024 inch thick laminate as such was well consolidated and showed no susceptibility to delamination either alone or when adhered to a substrate or backer.

EXAMPLE 2

This example also illustrates the practice of the present invention. A creped kraft paper core sheet, still wet after impregnation with phenol formaldehyde impregnating varnish, was coated with a mixture of materials as in Example 1 and dried, the dried sheet being used as the back sheet of a laminate prepared as above with the specially coated side of the sheet disposed outwardly. The resulting laminate adhered without sanding to a particle board substrate when glued with contact adhesive, white glue, urea based glue and resorcinol formaldehyde adhesive. No blocking occurred when the coated sheet was stored in a roll or stacked. Neither was any delamination detected in the laminate as such or in the laminate as adhered to the substrate.

The following examples illustrate departures from the present invention which proved unsuccessful.

EXAMPLE 3

Raw unimpregnated kraft paper was coated with a mixture of 95 percent polyvinyl acetate beads having a molar viscosity of 22.5 to 27.7 cps when dissolved in benzene and measured in a No. 200 Ostwald-Fenske tube at 20°C and a softening point of about 155°C along with 5 percent by weight of polyvinyl acetate beads having a molar viscosity of 720 to 880 cps when dissolved in benzene and measured on a Brookfield viscometer, Model RVO, at 20°C using a No. 2 spindle at 20 rpm, such polyvinyl acetate mixture being dissolved in one instance in acetone and in another instance in methanol at 25 percent by weight solids content. While such kraft paper after the coating was dried produced a laminate back sheet which did not block in storage and which was adherable using contact adhesive, it did not produce a satisfactory bond using white glue or urea based glue. Additionally, the adhered laminate tended to delaminate at the specially treated back sheet.

EXAMPLE 4

When a sheet of kraft paper still wet from the phenol formaldehyde resin impregnated varnish was coated with a 25 percent by weight percent acetone or methanol solution of the 720 to 880 cps polyvinyl acetate, dried and the sheet used as the back sheet of a laminate, the imprinted laminate was adherable to a substrate or backer using contact adhesive with no delamination. However, a laminate with such a sheet was not adherable using the less expensive urea based glue, white glue or resorcinol glue.

EXAMPLE 5

When a raw unimpregnated kraft paper sheet was coated with Airflex 400 alone as described above, the resulting sheet when stored in a roll or when stacked blocked to the point of uselessness. When the sheet was used as a backing sheet of a laminate, good adherence using contact adhesive, white glue, urea based glue and resorcinol glue was obtained but delamination occurred at the back sheet consistently.

EXAMPLE 6

When a sheet of kraft paper was impregnated with phenol formaldehyde resin and coated with the Airflex 400 material while the sheet was still wet from the phenolic varnish, the sheet after coating being dried, there was no delamination when such sheet was used as the back sheet of a high pressure laminate. The laminate also adhered satisfactorily without sanding to a substrate using contact adhesive, white glue, urea based glue and resorcinol glue. However, the serious blocking of this material, as wraps in a roll or when stored in stacks, made it useless from a practical point of view.

EXAMPLE 7

When a polyvinyl acetate emulsion, specifically the above Elvacet 81–900, was used to coat an unimpregnated kraft paper sheet on one side with the sheet being dried and used as the back sheet of a high pressure laminate, the laminate adhered satisfactorily with a wide range of bonding materials including contact adhesive, urea based blue, white glue and resorcinol adhesive. However, there was serious delamination at such back sheet in the finished laminate and the sheets so coated blocked when stored in contact with themselves.

EXAMPLE 8

When Example 7 was repeated except that the Elvacet 81–900 was applied to a still wet phenol formaldehyde resin impregnated kraft sheet, the sheets when stored as such exhibited serious blocking tendencies. The high pressure laminate in which the sheets were used as the back sheet adhered without sanding using contact adhesive, urea based adhesive, white glue and resorcinol glue without delamination.

EXAMPLE 9

When a mixture by weight of 75 percent Airflex 400 and 25 percent Elvacet 81–900 was used to coat one side of a raw kraft paper sheet, the sheet being dried and then used as the back sheet of a laminate, such laminate adhered well when glued to a substrate using contact adhesive, white glue, urea based glue and resorcinol glue without prior sanding. However, such laminates deliminated seriously even though there was no blocking when sheets so treated were stored in a roll or as sheets in a pile.

EXAMPLE 10

When craped kraft paper was impregnated with phenolic varnish, coated with Airflex 400 emulsion, and dried, serious blocking of the sheets occurred when rolled or piled or laid up as sheets in a pile. A laminate using such a sheet as the back sheet showed adequate adherence to a substrate without sanding, using contact adhesives, white glue, urea based glue and resorcinol glue.

EXAMPLE 11

When creped kraft paper was impregnated with phenolic varnish and coated while still wet with Elvacet 81–900 polyvinyl acetate emulsion and dried, blocking occurred when the coated sheet was rolled up upon itself or when sheets of such material were piled up. A laminate using the dried sheet as the back layer adhered without sanding to substrates when glued with contact adhesive, urea based glues, white glue and resorcinol glue.

From the above it will be quite evident that by practicing the present invention as typified by Examples 1 and 2, there can be prepared laminate back sheets which are non-blocking and which, when assembled into a laminate, can be adhered to substrates with a wide variety of glues without relatively expensive sanding with consequent loss of laminate material and breakage. This is as opposed to the usual situation where, generally speaking, only relatively expensive contact adhesives can be used without sanding the laminate. It will also be evident from the remaining examples that departures in one way or another from the very specific teaching of the present invention produce coated sheets or laminates, or both, which are characterized by serious deficiencies such as blocking of the sheets, laminates which adhere to a substrate only with selected adhesives and usually the more expensive contact adhesives or which, even though non-blocking in sheet form of the adherent in laminate form, are plagued with delamination in actual use.

What I claim as new and desire to secure by Letters Patent of the United States is:

1. A resin impregnated plastic laminate which is readily adherable to a substrate without sanding, the adhering surface of said laminate being a paper sheet which during its preparation and before layup and consolidation into the laminate is treated immediately after resin impregnation and before drying with essentially a mixture of by weight, about 65 to 80 percent polyvinyl acetate-ethylene copolymer emulsion and about 35 to 20 percent of a dispersion of vinyl acetate homopolymer, said treated paper sheet being also non-blocking.

2. A laminate as in claim 1 in which said copolymer emulsion is a copolymer of ethylene and polyvinyl acetate having a solids content of about 55 to 57 percent by weight and a viscosity of 1100 to 1600 centipoises at 77°F and said homopolymer of vinyl acetate has a viscosity of 8.5 to 10 poises at 77'F.

3. The process of making the resin impregnated laminate which is non-blocking and readily adherable without sanding to a substrate which process comprises treating the adhering paper sheet before layup and consolidation into a laminate and immediately after resin impregnation and before drying with essentially a mixture of by weight about 65 to 80 percent polyvinyl acetate ethylene copolymer emulsion and about 35 to 20 percent of a dispersion of vinyl acetate homopolymer.

* * * * *